No. 830,146. PATENTED SEPT. 4, 1906.
B. T. HAMILTON & L. STROUD.
LOCKING DEVICE.
APPLICATION FILED OCT. 2, 1905.
3 SHEETS—SHEET 1.
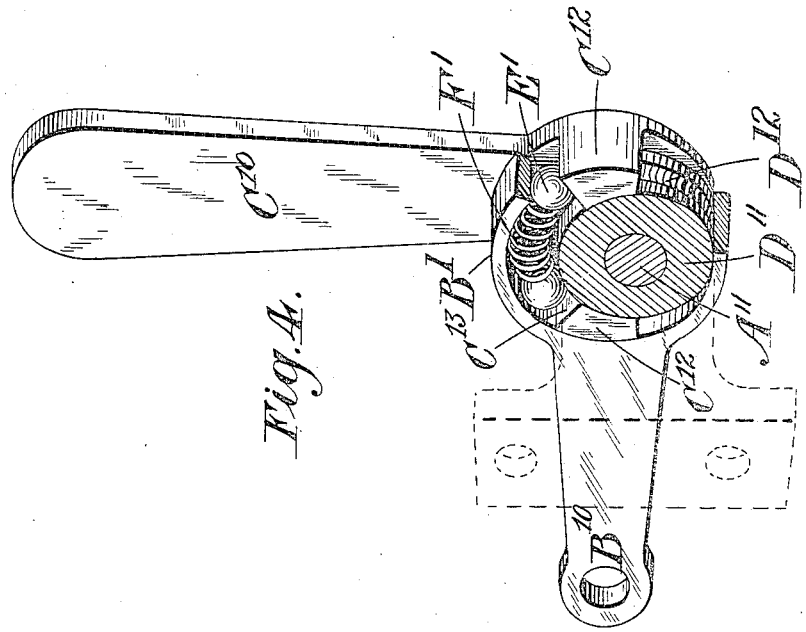
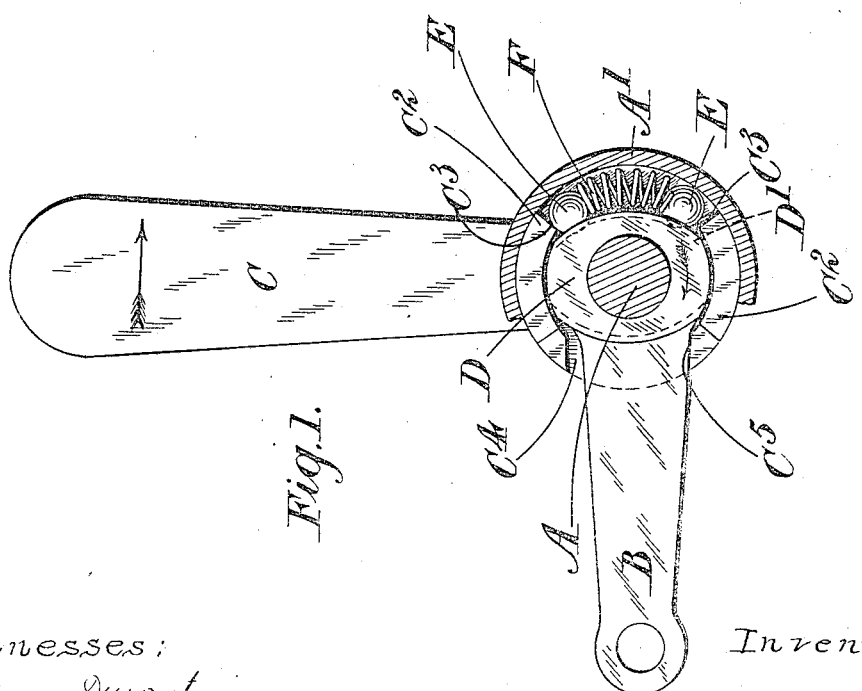
Witnesses:
Thomas Durant
Melville D. Church
Inventors:
Belton T. Hamilton
Lewis Stroud
by Church & Church
their attys.

No. 830,146. PATENTED SEPT. 4, 1906.
B. T. HAMILTON & L. STROUD.
LOCKING DEVICE.
APPLICATION FILED OCT. 2, 1905.
3 SHEETS—SHEET 2.
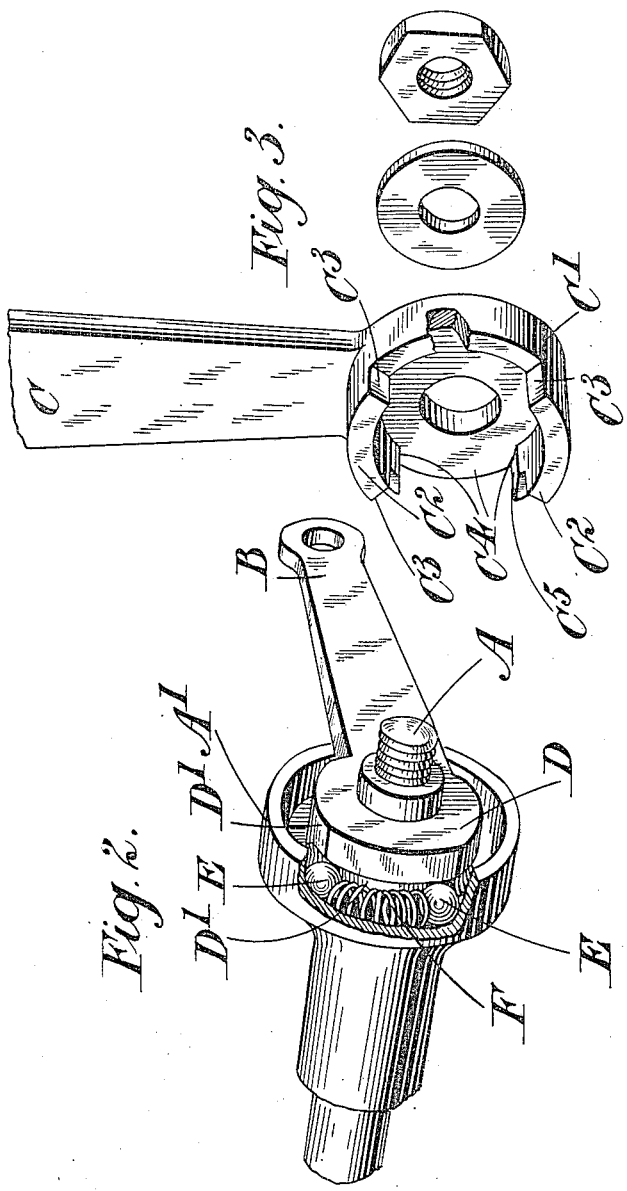
Witnesses,
Thomas Duran
Melville D. Church
Inventors:
Belton T. Hamilton and
Lewis Stroud
by Church & Church
their Attys No. 830,146. PATENTED SEPT. 4, 1906.
B. T. HAMILTON & L. STROUD.
LOCKING DEVICE.
APPLICATION FILED OCT. 2, 1905.
3 SHEETS—SHEET 3.
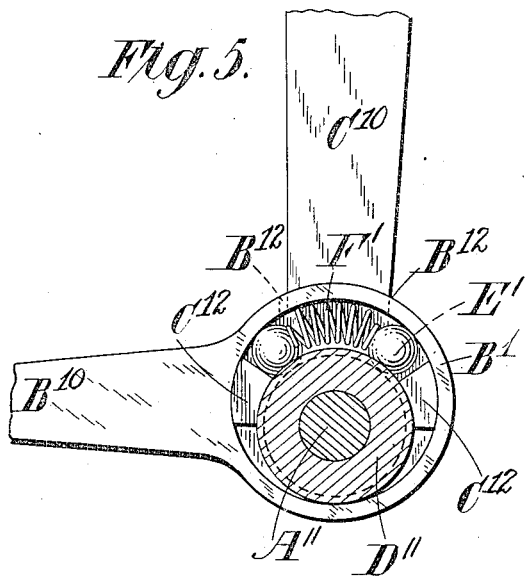
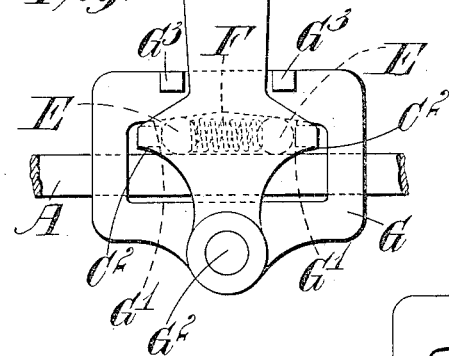
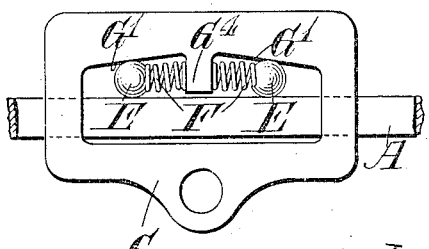
Witnesses:
Thomas Durant
Melville D. Church
Inventors:
Belton T. Hamilton and
Lewis Stroud
by Church & Church
their attys

UNITED STATES PATENT OFFICE.

BELTON TATTNALL HAMILTON, OF FINCHLEY, AND LEWIS STROUD, OF LONDON, ENGLAND.

LOCKING DEVICE.

No. 830,146.  Specification of Letters Patent.  Patented Sept. 4, 1906.

Application filed October 2, 1905. Serial No. 281,015.

*To all whom it may concern:*

Be it known that we, BELTON TATTNALL HAMILTON, residing at Finchley, county of Middlesex, and LEWIS STROUD, residing at London, England, subjects of the King of England, have invented certain new and useful Locking Devices, of which the following is a specification.

This invention relates to improved means for locking the moving element of a turning or sliding gear to a fixed or non-moving element of the said gear.

The invention is applicable to many different purposes, but as it is particularly so to the small control-levers used in self-propelled vehicles we will in this specification describe and illustrate it as so applied. The mechanism is also suitable for larger applications on self-propelled vehicles—such, for example, as for applying and holding the brakes and also for the steering mechanism in place of or in addition to the usual worm-gear.

As applied to a small control-lever the invention comprises the moving member and the fixed member, the means of connecting and disconnecting those members, and a handle by which the device is operated.

The following drawings will serve to indicate the construction and operation of the mechanism.

In the accompanying drawings, Figure 1 is an elevation, partly in section, of a turning control-lever complete, Fig. 2 being a perspective view, partly in section and with the handle removed, and Fig. 3 showing the handle in perspective and the nut and washer by which it is fixed. Fig. 4 is a perspective view, with the fixed member or supporting-bracket removed, of a modification, Fig. 5 being a similar view, but not in perspective, of the same parts. Figs. 6 and 7 are elevations of the device as applied to a sliding mechanism.

The fixed member would usually be or form part of the supporting-bracket or other device which carries the lever. In Figs. 1 to 5 it is indicated as the central stud or pin A A''. In Figs. 6 and 7 it is the bar upon which the other parts slide. Upon A is pivoted the arm B, which is connected by a rod, cord, or other suitable device with the part to be moved. This part B is therefore the part of the control-lever which has on occasion to be moved by the handle C, but normally has to be held stationary in the position at which it is set by the movement of the handle. B is rigidly connected to the piece D, which in Fig. 1 is shown cam-shaped and in Figs. 4 and 5 is shown circular. According to Figs. 1 to 3 this cam-shaped member is grooved at D', as indicated in dotted lines in Fig. 1 and by full lines and shading in Fig. 2, so as to form a race or track for the balls E, between which lies the helical spring F, which serves to force the balls apart. The fixed member A also carries the outer casing or shell A', which is preferably a part of it, and the balls E and spring F lie in the space between the cam-shaped member D and the inside of A'.

The handle C has an enlarged circular end or head C', adapted to fit inside A' and having projecting portions C², the edges or faces C³ of which bear against the balls E, as shown in Fig. 1. A collar or circular flange, of which the projections C² are part, is further recessed at C⁴ to receive the arm B, the recesses being slightly wider than the arm to allow of a certain amount of lost motion, so as to give the necessary amount of play for the purpose of releasing the balls when it is required to move the lever.

The operation of the device shown in Fig. 1 is as follows: Pressure being applied to the handle C in the direction of the arrow, the end or working face C³ of the top lug C² is pressed against the contiguous ball E, forcing it against the spring, and thereby releasing it from the casing A' and the cam D, between which it was previously jammed. The movement of the handle withdraws the face C³ of the other lug C² from the other ball E, thereby permitting it to travel forward still in the direction indicated by the arrow on C. This movement is due to the freedom allowed to B in C⁴. When the handle C has moved its allotted distance, the face C⁵ engages the arm B, which being, as previously explained, rigid with D, the latter is now turned still in the direction of the arrows on C and on D. This movement has the effect of moving the obstructing portion of the cam D from the path which the second ball E under the influence of its spring desires to pursue, and consequently as the lever is moved both balls are released from their locking action upon D, which is therefore free to move until the handle is released. Upon the removal of pressure from C both balls under the influence of the spring F immediately return to their locking positions and firmly hold D, so that B cannot be moved, and no reasonable pressure upon B will enable it to be again moved until the handle C is operated. The action in the reverse direction is precisely the same, excepting that all the movements are reversed.

In the arrangement shown in Figs. 4 and 5 the operation is the same as that above described, but the construction varies in the following manner: The fixed member A″ is in the center of the part $D^{11}$, which in this case is circular and grooved at $D^{12}$, both the fixed member and the part $D^{11}$ being eccentric to the casing B′, which in this construction is rigidly connected to or is actually part of the arm $B^{10}$. The handle $C^{10}$ and lugs $C^{12}$, having bearing-faces $C^{13}$, lie inside the casing B′, as before, and operate in just the same manner, a recess $B^{12}$ being provided in the casing B′ for the reception of the handle $C^{11}$, spring F′ and balls E′, located and operating as in the former construction, being also employed.

In Fig. 6 a sliding member G slides upon the fixed bar A and has inclined faces G′, between which and the bar A lie the balls E and spring F, as before. The handle C is pivoted at $G^2$ and lies between the stops $G^3$, and though the movement of the movable member is linear instead of angular the operation is the same as that previously described and will be readily understood by reference to Fig. 6.

In Fig. 7 the construction is the same as Fig. 6, excepting that two springs F are employed, with a lug $G^4$ between them. The operation is the same as before.

What we claim as our invention, and desire to secure by Letters Patent, is—

1. In a locking device for two-way operating mechanism the combination of an operated member free to be moved back and forth, an operating member operatively connected with the operated member but having a given amount of free movement relatively thereto, a fixed member opposed to the operated member and having its opposed face parallel to the path of travel of that member, the operated member having a double cam-face on that side toward the other member, two rolling friction gripping-bodies mounted in the space between the cam-face of the one member and the opposed face of the other and means for normally keeping these bodies apart so that they lie at opposite ends of the double cam-face and lock the operated and fixed members together, the operating member having lugs disposed beyond the friction-bodies and on opposite sides of the same, and at such a distance therefrom that the free movement of the operating member brings the lug on one side into contact with that friction-body which opposes movement in that direction, substantially as and for the purpose set forth.

2. In a locking device for two-way operating mechanism the combination of an operated member free to be oscillated about a given center, an operating member adapted to be oscillated about the same center as the operated member, a fixed member one wall of which is concentric with the center about which the operated member turns, oppositely-directed cams on the operated member and opposed to the said wall of the fixed member, rolling friction-bodies situated between the operated member and the fixed member so that they engage the cams on the former and means for keeping them in their respective positions the operating member having lugs adapted to push back that friction-body which locks the operated member from moving in the direction in which the operating member is moved, substantially as and for the purpose set forth.

3. In a locking device for two-way operating mechanism the combination of an operated member free to be oscillated about a given center, an operating member adapted to be oscillated about the same center as the operated member, a fixed cylindrical casing concentric with the center about which the operated member turns, a double-faced cam on the operated member disposed within the fixed member so that a space is left on one side between the inner periphery of the casing and the outer periphery of the fixed member, rolling friction-bodies E mounted within this space and engaging the two members and a spring disposed between them to retain them at the limit of their movements, the operating member having lugs $C^2$ which project into the fixed casing A′ and lie at such a distance from the gripping-bodies that when the operating member is moved in either direction that lug which advances comes into contact with and displaces the gripping-body nearest to it before the operating member comes to the limit of its free movement relatively to the operated member, substantially as and for the purpose set forth.

In testimony whereof we have signed our names to this specification in the presence of two subscribing witnesses.

BELTON TATTNALL HAMILTON.
LEWIS STROUD.

Witnesses:
T. J. OSMAN,
HARRY B. BRIDGE.